US010082426B2

(12) United States Patent
Haldane et al.

(10) Patent No.: US 10,082,426 B2
(45) Date of Patent: Sep. 25, 2018

(54) SPECTROMETER

(71) Applicant: Andor Technology Limited, Belfast (GB)

(72) Inventors: Tristan Haldane, Belfast (GB); Andrew Dennis, Belfast (GB)

(73) Assignee: ANDOR TECHNOLOGY LIMITED (GB)

( * ) Notice: Subject to any disclaimer, the term of this patent is extended or adjusted under 35 U.S.C. 154(b) by 0 days.

(21) Appl. No.: 15/328,447

(22) PCT Filed: Jul. 23, 2015

(86) PCT No.: PCT/GB2015/052128
§ 371 (c)(1),
(2) Date: Jan. 23, 2017

(87) PCT Pub. No.: WO2016/012794
PCT Pub. Date: Jan. 28, 2016

(65) Prior Publication Data
US 2017/0211974 A1    Jul. 27, 2017

(30) Foreign Application Priority Data

Jul. 23, 2014    (GB) ..................................... 1413085

(51) Int. Cl.
*G01J 3/28*        (2006.01)
*G01J 3/02*        (2006.01)
*G01J 3/18*        (2006.01)

(52) U.S. Cl.
CPC ........... *G01J 3/0208* (2013.01); *G01J 3/0237* (2013.01); *G01J 3/0275* (2013.01); *G01J 3/1804* (2013.01)

(58) Field of Classification Search
CPC ...... G01J 3/0208; G01J 3/0237; G01J 3/0275; G01J 3/1804

(Continued)

(56) References Cited

U.S. PATENT DOCUMENTS

2013/0169959 A1    7/2013 Guenther
2014/0028996 A1    1/2014 Liu et al.
2015/0369665 A1*  12/2015 Hajian ...................... G01J 3/18
                                                         356/328

FOREIGN PATENT DOCUMENTS

JP    7-128146 A    5/1995
JP    8-292096 A    11/1996
(Continued)

OTHER PUBLICATIONS

E. Kretschmer, "Modelling of the Instrument Spectral Response of Conventional and Imaging Fourier Transform Spectrometers." Thèse, Université Laval, Philosophiæ Doctor, Québec, Canada, 2014.

*Primary Examiner* — Hina F Ayub
(74) *Attorney, Agent, or Firm* — Blank Rome LLP

(57) ABSTRACT

The present invention provides a spectrometer, comprising: an inlet for the receipt of incident light; an optical path for transmitting the incident light from the inlet to an analysis plane; a focusing element located along the optical path, wherein the spectrometer has an in-focus position in which a focal point of the spectrometer and the analysis plane coincide; and a controller adapted in use, when a removable light disperser is placed along the optical path, to cause the spectrometer to be in the in-focus position by controlling the position of the focusing element relative to the analysis plane. The spectrometer is used in the analysis of light from a light source and, due to the ability of the controller to manage the focus point by way of moving the focusing element, the spectrometer is able to bring itself into an in-focus configuration without the need for a user to intervene.

23 Claims, 4 Drawing Sheets

(58) Field of Classification Search
USPC .......................................................... 356/328
See application file for complete search history.

(56) References Cited

FOREIGN PATENT DOCUMENTS

| WO | WO 2005/024362 A1 | 3/2005 |
| WO | WO 2013/068627 A1 | 5/2013 |

* cited by examiner

SPECTROMETER

RELATED APPLICATIONS

This application is a national phase of PCT/GB2015/052128, filed on Jul. 23, 2015, which claims the benefit of United Kingdom Application No. 1413085.0, filed on Jul. 23, 2014. The content of these applications are hereby incorporated by reference.

FIELD OF THE INVENTION

The present invention relates to spectrometers, in particular to spectrometers in which the position of the focus is changeable.

BACKGROUND TO THE INVENTION

Spectrometers are used to measure the properties of light produced by a particular source. For example, spectrometers can be used to measure the wavelength of incoming light from a source. Usually, this is done using a spectrograph, which is typically a spectrometer that has a detector attached, and which has a sensor that is able to detect peaks across a wavelength range. The detectors on a spectrograph are usually interchangeable, so that a range of detectors are able to be used.

There are a number of different configurations of spectrometers. For example, a Czerny-Turner spectrometer has a slit through which light from a wide bandwidth source may pass. The light diverges from the slit and is collimated and passed onto a disperser, which separates the light into its constituent wavelengths. The light then passes to a focusing element, which is used to focus the light onto an imaging or analysing plane where the sensor of a detector may be located. In this manner, the wavelength spectrum of a light source can be assessed.

Frequently, a light source will have a wide wavelength spectrum; so, each spectrometer is usually designed to be capable of use over a wide range of wavelengths. This also saves on costs as a single spectrometer can be used for a range of light sources that have a range of wavelength distributions. Therefore, typically, a spectrometer will be capable of use over a wavelength range from approximately 180 nm to 16 μm (i.e. 16 micrometres/microns). This means that, typically, mirrors will be used to collimate and to focus the light as, for such a large range in wavelengths, it is not possible to use lenses. This is because lenses are usually only designed for, and capable of, functioning over a relatively small range of wavelengths to ensure the optical performance needed.

In order to disperse the light, diffraction gratings are typically used as dispersers. It is common for a diffraction grating to be "blazed" at a particular angle, i.e. the diffraction efficiency is optimised at a particular wavelength range. Different groove spacings are available on gratings; a low groove density grating such as 75 grooves per millimetre (g/mm) will allow a relatively large portion of the EM spectrum to fall on the sensor, but with a much lower spectral resolution than would a 3600 g/mm grating that would direct a smaller portion of the spectrum to the detector.

Each grating can only be used up to a certain angle, due to geometric considerations, and so high groove density gratings cannot be used to analyse high wavelengths. For these reasons, it is often the case that a user wishes to swap easily between multiple gratings, either to analyse different wavelength ranges, or to analyse with higher resolution but a shorter wavelength range. Therefore, if multiple gratings are to be used, the grating in a spectrometer with which the light interacts will have to be exchanged for a different grating. This can, for example, be affected by removing one grating from the spectrometer and replacing it with another, or by having a number of gratings on a rotatable turntable and turning the turntable to move one grating to intercept the light in place of another.

To get the best results from a spectrometer, a detector must be located as close as possible to the focus point of the spectrometer. Typically, this is achieved by attaching the detector to the spectrometer with a flange so that the detectors sensor sits at the focus point. Once the detector has been fixed in place, any later adjustments are usually difficult as the spectrometer and the detector are heavy, difficult to move and are sensitive instruments, so disruption is not a trivial matter and may take significant time and effort.

Although it is important that the detector is located at the focal point of the focusing element, it may not be possible to know exactly where the focus point is. As such, the spectrometer is calibrated to have the focal point located at an analysis plane, which is the position at which the sensor of a detector is positioned when the detector is attached to the spectrometer. When the focus point is in this position, the spectrometer is "in focus". However, a number of factors can cause the focal point to shift causing the spectrometer to be out of focus.

There are a number of reasons that the focal point may shift. For example, the angle at which the diffraction grating is presented to the focusing element alters optical aberrations present at the detector that can be mitigated by a change in focus. Spectrometers may have more than one entrance option, and more than one exit option; these optional light paths are utilised by the insertion of a plane mirror at the appropriate point. The change in configuration may bring about a small change in focus. Additionally, no two diffraction gratings will be the same, and their surface texture (e.g. surface flatness) will be different. Therefore, although the difference in surface flatness may be as small as a few microns, this can introduce an additional 'optical power' (i.e. the degree to which the system converges or diverges the light) to the system which can, again, be mitigated by the position of the focusing element. The shift in the position of the focus point is likely to be small, therefore requiring small and precise adjustments to the position of the detector in order to restore it to the position at which the spectrometer is focused.

Making precision adjustments to the position of a detector causes significant difficulties due to the size of the detector and the means by which it is attached to the detector (i.e. the flange). Indeed, due to the precision needed for the adjustments, it can be necessary to completely remove the detector from the spectrometer to enable the flange and connections to be appropriately adapted before the spectrometer can be replaced in the correct position. This is impractical.

Therefore, a problem exists as to how to ensure that the focus of the spectrometer is maintained for different configurations and a wide range of measurements, without manually intervening in the delicate optical set-up of the spectrometer.

SUMMARY OF THE INVENTION

According to a first aspect of the invention, there is provided a spectrometer, comprising: an inlet for the receipt of incident light; an optical path for transmitting the incident light from the inlet to an analysis plane; a focusing element located along the optical path, wherein the spectrometer has an in-focus position in which a focal point of the spectrometer and the analysis plane coincide; and a controller adapted in use, when a removable light disperser is placed along the optical path, to cause the spectrometer to be in the in-focus position by controlling the position of the focusing element relative to the analysis plane.

We have therefore devised a spectrometer that is able to adapt the position of its focusing element in accordance with the presence of a removable light dispersing element to ensure that the position of the focus is in alignment with an analysis plane at which light passing through the spectrometer is analysed when a light dispersing element is placed along the optical path, and that said alignment is consistent when different light dispersing elements are placed along the optical path. Due to the ability of the controller to manage the focus by way of moving the focusing element, the spectrometer is able to bring itself into an in-focus configuration without the need for a user to intervene. This may be achieved by the prior evaluation of a relationship between the position (including the angle) of the removable light disperser placed along the optical path and the focusing element. Thus, an automatic focus function may be provided by the controller as the user operates the spectrometer.

This has the advantage that there is no need for a bulky flange to be used so that the image on a detector is in focus, as is currently used. This means that the spectrometer can be more compact and is able to have a consistent focus that does not require manual adjustments or component-specific reconfiguring when a removable light disperser is placed along the optical path to allow an aspect of the light passing through the spectrometer to be analysed. This also means that the controller is able to account for any difference in the orientation, position or shape between one removable light disperser and another, and therefore for any change of removable light disperser.

The focusing element may be moveable along a rail by the controller. This allows any movement of the focusing element to be repeatable, and for the movement to be consistent.

Preferably, the focusing element is moveable linearly, such that for small movements there will be negligible change in the wavelength range of the light directed onto the analysis plane. Essentially, the focusing element is moveable along a straight path, movement along which increases or decreases the distance between the focusing element and the analysis plane. Moving the focusing element in such a linear manner allows for the greatest effect on the focus point of the spectrometer whilst minimising any other effects of the movement of the focusing element. An example range of movement of the focusing element is 12 millimetres (mm).

The focusing element may be a specialised reflector, or some form of lens (although lenses have associated disadvantages in terms of introducing aberration and other optical effects). Typically however, the focusing element is a mirror. This has the advantage that the focusing element, and therefore the spectrometer can be used to analyse light over a wide range of wavelengths, such as from far UV light (e.g. 180 nm) up to far IR light (e.g. 16 µm), without the need to replace an element to allow a part of the spectrum to be analysed. Below 180 nm the invention could be used in Vacuum Spectrometers, as air is a significant absorber in this region.

The spectrometer may further comprise a collimator in the optical path between the inlet and the removable light disperser. This enables the spectrometer to be used to analyse un-collimated light, and provides a portion of the optical path along which the dispersion of the light is reduced.

The collimator may be a reflector, or some form of a lens. Typically, the collimator may be a mirror. As noted for the focusing element, using a mirror for the collimator has the advantage that the focusing element, and therefore the spectrometer can be used to analyse light over a wide range of wavelengths, such as from far UV light to far IR light, without the need to replace an element to allow a desired part of the spectrum to be analysed.

In addition to the being adapted in use to cause the spectrometer to be in the in-focus position by controlling the position of the focusing element relative to the analysis plane when a removable light disperser is placed along the optical path, typically, the controller is adapted in use, in accordance with the position of the removable light disperser, to cause the spectrometer to be in the in-focus position by controlling the position of the focusing element relative to the analysis plane. This is advantageous because it allows the spectrometer to be kept in focus when the location or orientation of the removable light disperser is changed.

Furthermore, typically, the removable light disperser is movable in the optical path when placed along the optical path, and the controller is adapted in use to maintain the spectrometer in the in-focus position on movement of the removable light disperser by controlling the position of the focusing element relative to the analysis plane. This is advantageous because it allows the position of the removable light disperser to be changed so that a different aspect of light can be analysed without requiring the user to manually re-focus the spectrometer.

The removable light disperser may be held in a fixed position, but typically, the removable light disperser may be mountable on a removable rotatable turret.

Rotating the removable light disperser with respect to the incident beam along the optical path within the spectrometer will affect the wavelength range that falls on the detector. Therefore, having the removable light disperser mounted on a removable rotatable turret allows the wavelength range to be known, and controlled.

The removable light disperser could be a prism although, since, like lenses, prisms introduce optical effects, typically the removable light disperser is a diffraction grating. This allows the incident light to be dispersed in an accurate and controllable manner as a function of wavelength.

The removable rotatable turret may have at least two diffraction gratings mounted thereon. Having multiple diffraction gratings on a single turret enables the spectrometer to be used to analyse different wavelength bands or other properties of a light source without replacing a component of the spectrometer. The respective diffraction gratings can be optimised differently and/or can be directed to different parts of the spectrum (i.e. to working for different wavelength ranges). This allows the spectrometer to be used for a broad range of light sources.

The diffraction gratings could be transmission diffraction gratings. However, typically, the diffraction grating(s) are reflective diffraction grating(s).

The controller may be adapted in use to maintain the spectrometer in the in-focus position by controlling the position of the focusing element relative to the analysis plane based on the particular removable light disperser being used.

This means that should one removable light disperser be exchanged in some manner for another removable light disperser, the controller is still able to make appropriate adjustments to the position of the focusing element so that the focus point is held at the analysis plane. As such, the controller may be able to recognise a particular removable light disperser and adapt the position of the focusing element accordingly. Should the controller not recognise, or not be able to recognise, a particular removable light disperser, it is able to conduct a calibration process in order to assess and store the position of the elements of the spectrometer (including the removable light disperser and/or the focusing element) when the spectrometer is in the in-focus position for that particular removable light disperser. Also, should a particular removable light disperser have any notable artefacts (for example, if the surface of a diffraction grating has a flaw or dip), then the controller will be able to make appropriate adjustments to the position of the focusing element when appropriate as the controller will know and/or will be able to analyse the particular removable light disperser in order to determine the appropriate position(s) for the focusing element to keep the spectrometer in the in-focus position.

The controller may be adapted in use to find the in-focus position by systematic analysis every time the configuration of the spectrometer components is changed. Typically however, the controller is adapted in use to maintain the spectrometer in the in-focus position by controlling the position of the focusing element relative to the analysis plane based on stored values and a fitted polynomial equation where applicable. This allows the controller to only store and process data relating to the polynomial equation (in particular the coefficients thereof) instead of storing extensive data tables. This thereby reduces the burden on the data storage capacity of the controller as it enables the controller to calculate the product of an equation instead of accessing one or more look-up tables. The processing time required to calculate the appropriate position for the focusing element is therefore reduced, which will speed up the time taken to adjust the position of the mirror when required.

Typically, the removable light disperser has a unique identifier recognisable by the controller. This is advantageous because it allows the spectrometer to recognise each removable light disperser so that it may reconfigure the components to make sure the spectrometer is in an in-focus position for that particular removable light disperser when it is placed along the optical path based on previously stored data. The unique identifier may typically be stored on an RFID tag attached to the removable light disperser.

The spectrometer may further comprise an optical element(s) able to reconfigure the optical path to transmit light from a second inlet and/or to a second analysis plane. This allows the spectrometer to be used with multiple light sources and/or multiple detectors simultaneously.

The focusing element may be a spherical mirror or a toroidal mirror, the choice of which being dependent upon the particular configuration of the internal optics of the spectrometer. Likewise, the collimator may be a spherical mirror or a toroidal mirror. As an alternative, the collimator mirror may be an aspheric collimating mirror.

According to a second aspect of the invention, there may be provided a spectrometer, comprising: an inlet for the receipt of incident light; an optical path for transmitting the incident light from the inlet to an analysis plane; a light disperser and a focusing element, each located along the optical path, wherein the spectrometer has an in-focus position in which a focal point of the spectrometer and the analysis plane coincide; and a controller adapted in use, in accordance with the position of the light disperser, to cause the spectrometer to be in the in-focus position by controlling the position of the focusing element relative to the analysis plane.

We have also therefore devised a spectrometer that is able to adapt the position of its focusing element in accordance with the particular configuration of its parts to ensure that the position of the focus is consistent, and is therefore held in alignment with an analysis plane at which light passing through the spectrometer is analysed. Due to the ability of the controller to manage the focus by way of moving the focusing element, the spectrometer is able to maintain an in-focus configuration itself without the need for a user to intervene. As with the first aspect, this may be achieved by the prior evaluation of a relationship between the position (including the angle) of the light disperser and the focusing element. Thus, an automatic focus function may be provided by the controller as the user operates the spectrometer.

In a similar manner to the first aspect, this is advantageous as there is no need for a bulky flange to be used so that the image on a detector is in focus. This allows the spectrometer to be compact and enables it to have a consistent focus that does not require manual adjustments or component-specific reconfiguring as the parts of the spectrometer are moved to allow analysis of a different constituent of the light passing through the spectrometer. This also means that the controller is able to account for the orientation of the light disperser, and therefore for any change in said orientation or location.

In accordance with the first aspect, when the removable light disperser is placed along the optical path, the spectrometer has an in-focus position in which a focal point of the spectrometer and the analysis plane coincide; and the spectrometer typically has a controller adapted in use, in accordance with the position of said removable light disperser, to cause the spectrometer to be in the in-focus position by controlling the position of the focusing element relative to the analysis plane. This corresponds to an optional combination of the first aspect and second aspect of the invention.

According to a third aspect of the invention, there is provided a spectrograph, comprising: a spectrometer as described in accordance with the first aspect and/or the second aspect, including an analysis plane; and a detector positioned with a detection sensor at the analysis plane of the spectrometer.

The spectrograph may further comprise an optical element(s) in the spectrometer able to reconfigure an optical path passing through the spectrometer to transmit light from a second inlet of the spectrometer and/or to a second analysis plane of the spectrometer. This allows the spectrograph to have multiple light sources and/or multiple detectors.

According to a fourth aspect of the invention, there is provided a method of identifying a focus point of a spectrometer, the method comprising:
obtaining a spectrum using the spectrometer according to the first aspect of the invention with a removable light disperser placed along the optical path or according to the second aspect of the invention, or a spectrograph according to a third aspect; and:
 i) analysing a peak in the spectrum by monitoring the geometry of the peak;
 ii) calculating a focus value for the peak in dependence upon the said monitored geometry;
 iii) repeating steps (i) and (ii) using different positions of the focusing element relative to the analysis plane; and
 iv) analysing said focus values so as to obtain an in-focus position.

Having obtained the focus values, step (iv) preferably further comprises analysing said focus values in accordance with the positions of the focusing element so as to generate relationship between said focus values and said positions. The relationship may take a number of forms, including a tabular relationship. Preferably, the relationship is expressed as a suitable mathematical relationship, such as a polynomial, logarithmic or exponential equation.

Typically, monitoring the geometry of the peak comprises monitoring the resolution of the peak and the asymmetry of the peak.

Typically, monitoring the resolution comprises monitoring one or each of the FWHM or peak intensity of the peak.

This method may be performed for each light disperser utilised in the spectrometer. The results of step (iv) may be embodied in a computer program product for execution by the controller. As will be appreciated the controller may take the form of any of a number of different computer systems. Having obtained the relationship between the position and the focus, this provides a way for the controller of a spectrometer to keep the spectrometer in focus without the need for a user to intervene to re-focus the spectrometer when one of the parts of the spectrometer moves. This method may be enacted whilst the spectrometer is in use (i.e. when it is being used to analyse a light source), or as a means of calibrating a spectrometer for later use.

In accordance with a fifth aspect of the invention there is provided a method of operating a spectrometer in accordance with the first aspect and/or second aspect, or a spectrograph in accordance with the third aspect, the method comprising monitoring the position of the (removable) light disperser (when placed along the optical path) and causing the spectrometer to be in the in-focus position by controlling the position of the focusing element relative to the analysis plane in accordance with a relationship derived according to the method of the fourth aspect of the invention.

BRIEF DESCRIPTION OF DRAWINGS

An example of a spectrometer and method according to the present invention are now described with reference to the accompanying drawings, in which.

DESCRIPTION OF EXAMPLE

Spectrometers need to be precisely focused at a predetermined position to ensure that the analysis that is conducted using a spectrometer is sufficiently precise, accurate and reliable. Should a spectrometer be out of focus, any results taken may not show the required detail held in the spectrum.

However, spectrometers are required to function with a wide range of light sources and analysis elements (i.e. light dispersing elements, such as diffraction gratings). This means that, for practical use, detector arrays need to be interchangeable, as do the analysis elements. Fundamentally, this has an effect on the focus position, as every different configuration will cause a slight difference in the length of the path along which light travels, therefore affecting the focus. So, to address this, a spectrometer has been devised that is capable of monitoring when a removable light dispersing element is placed along an optical path through the spectrometer and adjusting the focus point accordingly.

Figure 1:
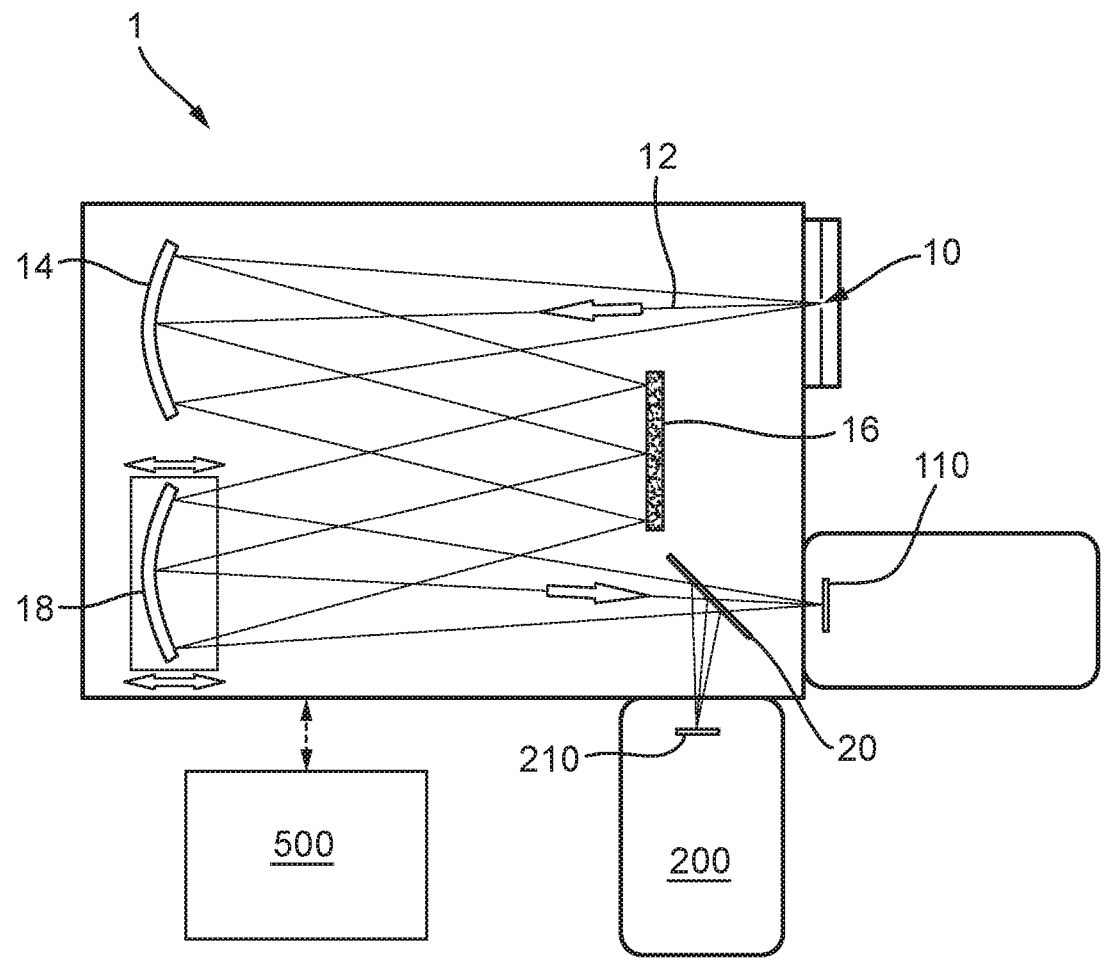
FIG. 1 shows a cross-sectional plan view of an example spectrograph.

An embodiment shown in FIG. 1 is a spectrometer 1 in a Czerny-Turner configuration. The spectrometer 1 has an entrance slit 10, which allows light to enter the interior of the spectrometer. The light passes along an optical path 12 and naturally spreads (i.e. by divergence) to the collimating mirror. For best performance in a Czerny-Turner spectrometer, the light incident on the dispersive element needs to be collimated. To collimate the light from the slit, a toroidal mirror 14 is used. The toroidal mirror 14 is orientated to reflect the light onto a location where a removable diffraction grating 16 is able to be placed, the orientation of which is adjustable to allow the angle at which the light reflected from the toroidal mirror is incident upon the removable diffraction grating to be altered.

The removable diffraction grating 16 is a reflective diffraction grating, and when placed along the optical path, the light is reflected and diffracted at angles determined by the wavelengths of the light incident upon the grating. Spatial information representing the slit 10 is represented at each wavelength, which is diffracted at a corresponding different angle as a function of wavelength. The angle at which the light of a particular wavelength is diffracted is determined by the diffraction orders of the diffraction grating, so each wavelength of light from a light source will be present in the light transmitted in each diffraction order. Typically, for Czerny-Turner spectrometers, only the light transmitted in the first order will be used to analyse the light from the light source. Other spectrometers, such as Echelle spectrometers, may analyse light transmitted in higher orders, such as the second or third order.

A spherical mirror 18 is positioned on the optical path 12 to intercept the light reflected (and diffracted) from the removable diffraction grating 16 when placed along the optical path. The spherical mirror is used to make the light converge on the detector 100. The light passes along the optical path from the spherical mirror converging towards a focus point.

In the embodiment shown in FIG. 1, an optional second exit path is shown, created by an automated plane mirror, which, when located in the optical path, diverts the beam path towards a second detector. These two detachable detectors may contain, for example, a silicon CCD sensor 110 and an InGaAs CCD sensor 210, which are sensitive to different wavelength ranges. The plane mirror is able to be moved into, and out of, the optical path when desired to redirect the path of the light onto the second detector 200. Although unconventional, this could alternatively be done with a beam splitter.

It is also possible to have an optional second inlet (not shown) for transmitting light into the spectrometer. In order to direct light onto the optical path from the second inlet, there may be a second automated plane mirror (not shown), which is moveable into, and out of, the optical path when desired. This means that when located in the optical path, light from the second inlet is directed through the spectrometer to one of the detectors instead of light from the first inlet.

As discussed above, there are a number of factors that can affect where the focus point of the spectrometer is located. Indeed, it is also possible that the distance that the light must travel to arrive at the first analysis plane will be different to the distance that the light must travel to arrive at the second analysis plane. For at least these reasons, it is advantageous to provide a mechanism by which the focus point can be moved in space. This is performed by a controller 500, which is able to move the spherical mirror 18 toward and away from the analysis plane(s). It should be noted here that FIG. 1 is schematic and in particular, the light leaving the diffraction grating is no longer collimated, and instead is dispersed as a function of wavelength.

The spherical mirror 18 is moveable as it is connected to a rail and bearing system (not shown) which enables it to slide to and fro under motorised control. To ensure that the controller moves the mirror to the appropriate position for focusing, it may monitor which detector is being used, and/or obtain data defining the internal configuration of the spectrometer. This is achieved by monitoring whether or not a diffraction grating is placed along the optical path, and the position and/or orientation of any diffraction grating placed along the optical path. The intensity of light received by the detector and the nature of the light received may be used for this purpose. Other inputs may include the size of the slit. When a change in the controller inputs is detected, the position of the mirror is adjusted accordingly. The controller is able to move the mirror to the correct position as the correct mirror position for each configuration corresponds to the result of a stored offset and a fitted polynomial equation stored in the controller. The fitted polynomial equation is the result of a calibration method, which is described in more detail later.

There are various alternative arrangements of the spectrometer. For example, the toroidal mirror and the spherical mirror can be switched, so the spherical mirror collimates the light, and the toroidal mirror focuses the light instead of the arrangement described above.

Figure 2:
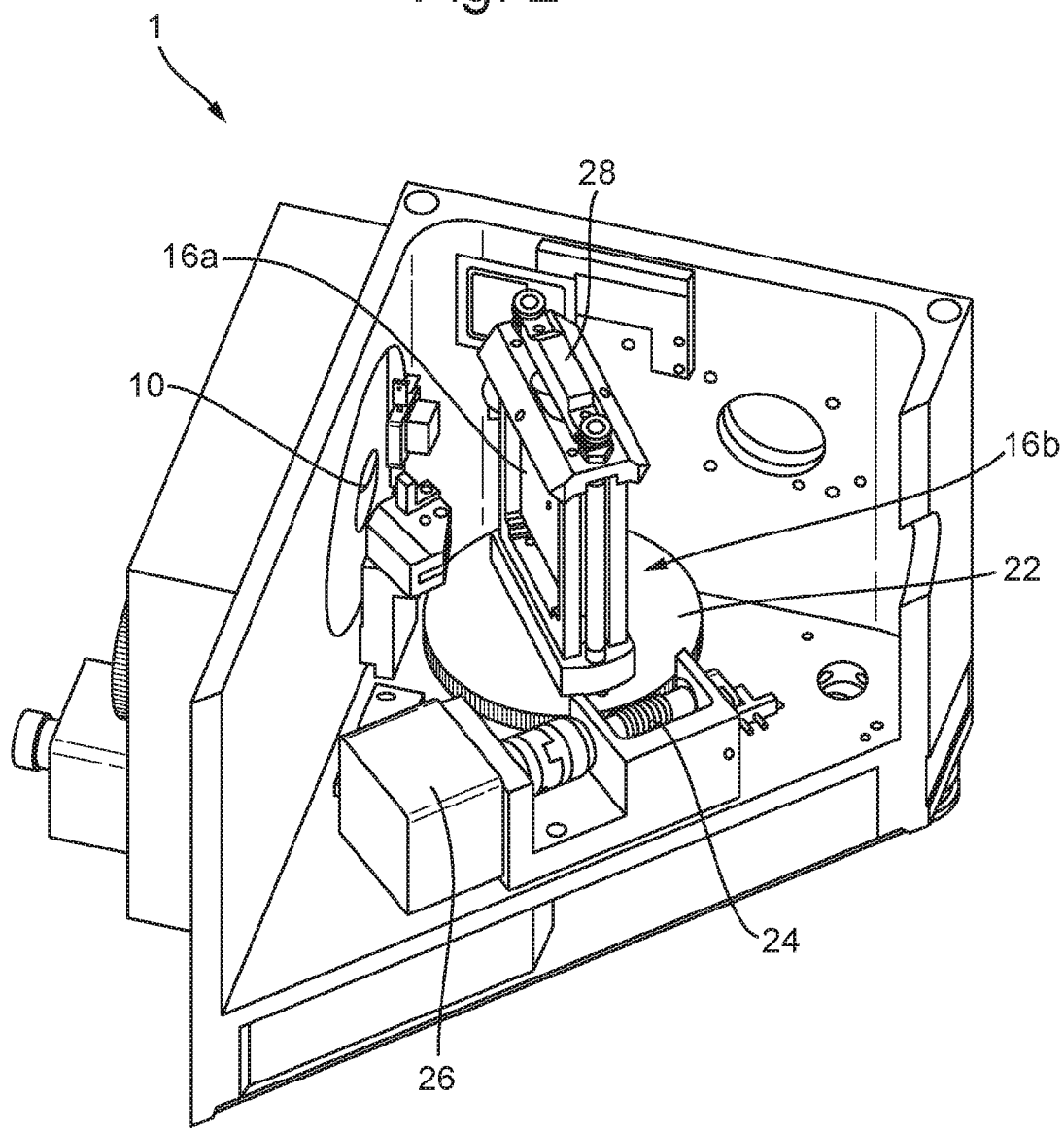
FIG. 2 shows a sectional view of an example spectrometer.

FIG. 2 shows part of the interior of a spectrometer 1 according to an embodiment. In this embodiment, there is a slit 10 acting as an inlet for light. The light then passes onto a collimating mirror (not shown) and then onto a removable diffraction grating 16a. The removable diffraction grating 16a is attached to a rotatable circular plate 22 (essentially a turntable), which has teeth around its circumference that engage with a screw gear 24. The screw gear is driven by a motor 26.

The removable diffraction grating 16a in FIG. 2 onto which the light is directed is part of a turret 28 that has two removable diffraction gratings, the removable diffraction grating 16a on which the light is incident in FIG. 2, which is on one side of the turret, and the removable diffraction grating 16b, which is one the opposite side of the turret.

Instead of having a turret with two removable diffraction gratings, a more complex arrangement having three removable diffraction gratings may be provided. In this case, the gratings are distributed in the turret in the configuration of an equilateral triangle centred upon the central axis of the plate. In this case, when one of the three gratings is in a use position, its reflective surface is distal from the centre of the plate 22. This enhances the defocusing effect of moving the diffraction grating to select a particular wavelength band (achieved by rotating the turret slightly).

Each different removable grating has a different predetermined function, such as being optimised for use with a particular wavelength band. These differences affect the focusing behaviour. In addition, even with removable diffraction gratings having nominally the same function, there exist different localised surface defects and imperfections, and different surface topologies (e.g. different degrees of surface flatnesses). These differences can be very small, for example if a grating has a constant bend, such that centre were displaced relative to the edge by 1 µm, the radius of curvature would be approximately 300 m and the focus point of the spectrometer would change by approximately 0.25 mm. This makes each grating unique, and therefore, each grating has a unique effect on the path length that the light travels, and therefore on the focal point of the light that is diffracted. In practice, this means that it is advantageous for the controller to locate the mirror in a bespoke set of positions as a function of position or detected wavelength for each diffraction grating. Thus, a bespoke relationship may be used for each diffraction grating.

In normal use, regardless of the configuration of the components of the spectrometer, the controller is adapted in use to cause the spectrometer to be in the in-focus position by controlling the position of the focusing element relative to the analysis plane when the removable light disperser is placed along the optical path. As detailed above, this is achieved by moving the focusing element to bring the focal point of the spectrometer into alignment with the analysis plane.

When light is to be analysed by the spectrometer, an appropriate removable light disperser is placed along the optical path. This removable light disperser will replace another removable light disperser already placed along the optical path, or will instead merely be placed along the optical path when no other removable light dispersing element is present. In any case, the spectrometer and, in particular the controller, then acts to bring the spectrometer into the in-focus position.

Although it is possible for the controller to store the positions of the focusing element itself as a function of diffraction grating and position (either as a result of a factory calibration or on-site calibration), each diffraction grating is able to have an RFID tag mounted to it, which holds a unique identifier. The controller is able to access and read the RFID tag and recognise the unique identifier. The unique identifier on the RFID tag may therefore be used to identify this information relating to the mirror positions for the diffraction grating to which the RFID holding that identifier is attached, including the respective positions of the mirror in order for the focus point to be correctly located for that diffraction grating in all the various possible positions, and/or the coefficients and nature of the equation by which the position(s) may be calculated. This information is stored either on the RFID tag following the calibration procedure being run for that specific diffraction grating or on the controller (or an appropriate storage device accessible by the controller) in association with the unique identifier.

The calibration process for a given diffraction grating or group of diffraction gratings held in a turret is now described in more detail.

This involves firstly installing the diffraction grating(s) in the spectrometer 1. The controller then seeks to find the position for the spherical mirror 18 in which the focus point of the spectrometer coincides with the analysis plane (i.e. the "best focus" position). Should there be more than one detector, each of which is located in a different position, the controller finds each position for the spherical mirror 18 in which the focus point of the spectrometer coincides with an analysis plane, noting which analysis plane the focus point coincides with.

Figure 3:
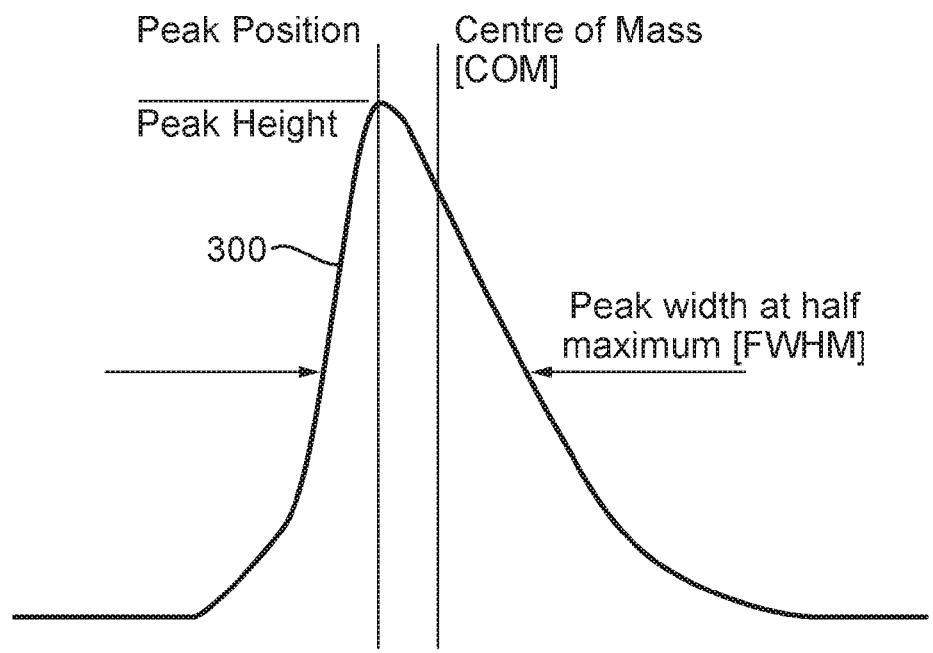
FIG. 3 shows an example wavelength peak on a detector.

The controller finds the appropriate position for the spherical mirror for a given configuration of the particular removable diffraction grating(s) by measuring a spectral peak 300 (shown in FIG. 3) imaged by the detector (or one of the detectors). The measured spectral peak 300 will have a unique shape that may be asymmetric. Indeed, the more out of focus the image detected is, the more asymmetric the peak is likely to be. The asymmetry is also affected by the removable diffraction grating being located "off-axis" (i.e. not on the axis of rotation) on the turret to which it is attached. More specifically, this occurs when the point of intersection between the optical beam and the surface of the removable diffraction grating moves physically in space as the diffraction grating is rotated.

By analysing the spectral peak, values are calculated for the Full Width at Half Maximum (FWHM), the peak height, the peak position, and the peak centre of mass (COM), where the peak position and COM are positions along an axis. The Asymmetry of the peak is then able to be calculated using the equation:

$$\text{Asymmetry} = \text{COM} - \text{Peak position} \quad (\text{Eq. 1})$$

A "Focus Value" is then calculated from these values using the equation:

$$\text{Focus Value} = \frac{(A \times FWHM)(B \times \text{Height})}{(C \times \text{Asymmetry})} \quad (\text{Eq. 2})$$

where A, B and C are constants used to weight each contribution.

Figure 4:
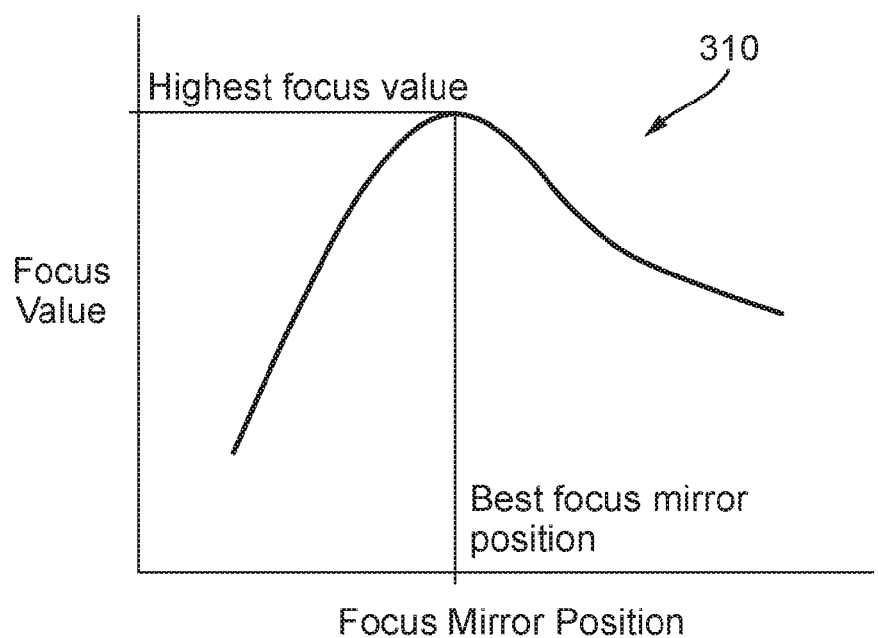
FIG. 4 shows an example plot of focusing element position against focal value.

The mirror is placed at a number of positions in order to generate a number of focus values and to find the best focus position. To do this, the mirror position is retracted to one end of the rail, and is then stepped forward in coarse increments to find an approximate best position. After every movement, the Focus Value is calculated, and recorded. The recorded Focus Value can then be plotted against the position of the mirror. The mirror is then retracted back towards its original position from the best coarse position found, and is stepped forward in fine increments to "home in on" the best focus position. This produces a plot 310 (shown in FIG. 4), which has a curve with a maximum (i.e. the highest Focus Value). The highest Focus Value represents where the spectrum has the highest degree of focus. The process is then repeated for other spectral lines visible at different grating angles.

The position of the mirror at the best focus position for each angle of the diffraction grating analysed is plotted. Once the plot is complete, the curve produced is modelled, and the coefficients of the polynomial fit are stored. This process is conducted for all gratings. Additionally, offsets from the nominal best focus value are determined and stored for different configurations of the spectrometer, i.e. when the path length is changed due to the use of a secondary entrance/exit for the light into or out of the spectrometer.

Although the calibration process uses FWHM and Peak Height, it is possible to only use one, in conjunction with the Asymmetry value. This is because the area under the peak is a measure of the radiant flux (i.e. the intensity of light from a light source over a fixed exposure time) at that wavelength from the calibration light source, which is constant, so if the peak is narrower, it must become taller, so, to a large extent, FWHM and Peak Height are measuring the same aspect of the spectral peak being measured. In other words, the intensity of light incident on the detector over a given period is constant irrespective how focused the light is, so the area under a wavelength peak is constant relative to how focused the light is, so FWHM and Peak Height are effectively the measuring the same property.

Figure 5:
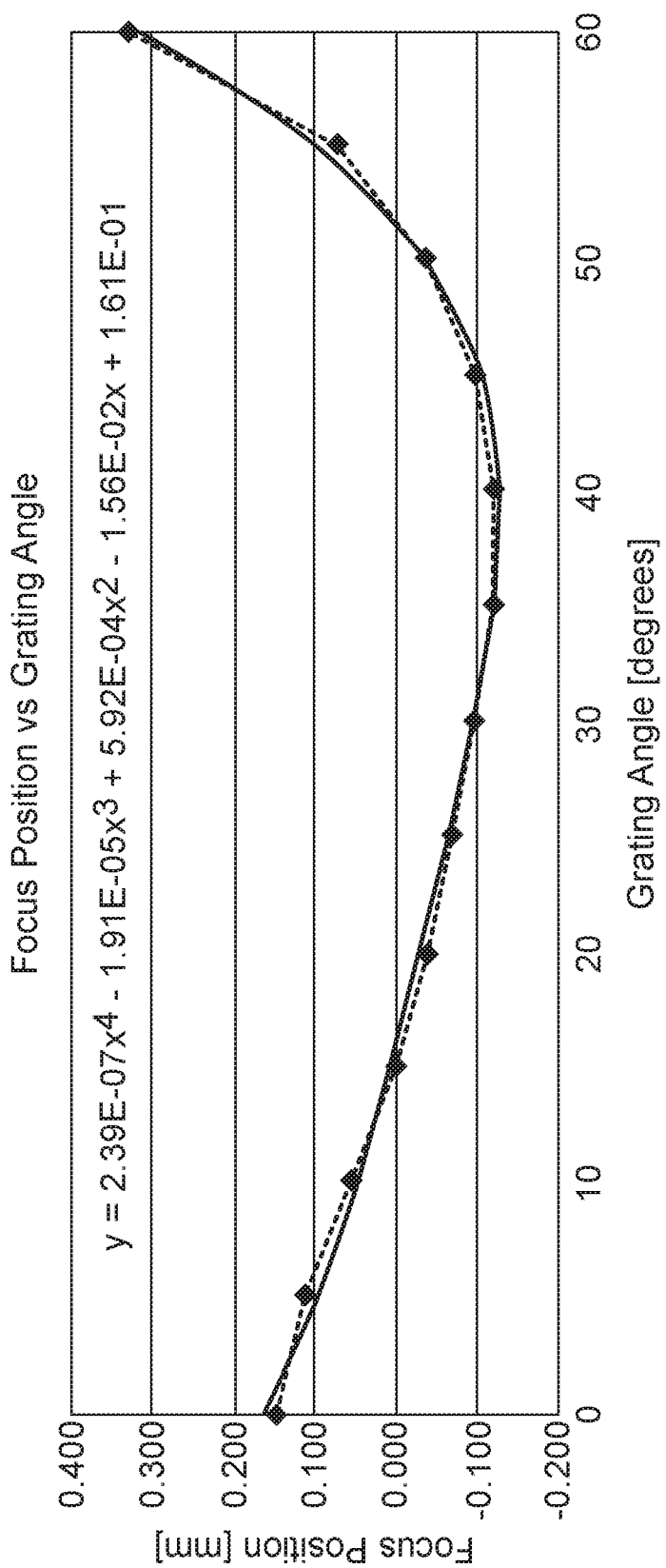
FIG. 5 shows an example plot of diffraction grating angle against position of the focal point.

As an example of how the angle that the removable diffraction grating is held at affects the focus position, FIG. 5 shows a plot of grating angle against focus position for a flat diffraction grating. This shows that for a given removable diffraction grating, which is rotated through 60°, the range in movement of the focus position is around 0.45 mm, with a total travel distance of the focal point being approximately 0.725 mm. Given that the detectors are in a fixed position, this is a significant movement in the best focus point, which would have a noticeable effect on the quality of the analysis conducted should the controller not act to re-focus the spectrometer when one removable diffraction grating is replaced with another along the optical path and/or when a removable diffraction grating is moved.

The change in focus position means that it is important to be able to adjust the position of the mirror when the diffraction grating is rotated. When the diffraction grating is rotated, the controller automatically adjusts the focus mirror (i.e. the spherical mirror) position based on an equation relating the angle of the grating to a small focus adjustment. This equation is preferably calculated by the controller from values that are held on an RFID tag that is associated with each grating or from stored information that is associated with a unique identifier held by the RFID tag. This means a user can use a new/different turret with different gratings and all adjustments will work seamlessly when they place the new turret in their spectrograph.

In reality, a diffraction grating has slight deviations from flatness, which means that each grating will have a different effect on the focus position, and therefore a different equation will need to be used to position the spherical mirror. For example, if a user has a 2400 gpmm grating (i.e. a grating with 2400 grooves per millimetre) and changes from a centre wavelength of 210 nm (i.e. changes from measuring light with a wavelength of 210 nm) with the grating angle at 15 degrees, to a centre wavelength of 570 nm, with the grating angle at 45 degrees, the focus mirror will be automatically moved by the controller in accordance with the equation for that diffraction grating (e.g. −0.1 mm) to compensate for the change in focus position.

If the grating had a slight curvature, e.g. a radius of curvature of 500 m (real differences in focus position seen in spectrographs shows this is possible, and not uncommon, in diffraction gratings), then the magnitude of the focus position change is increased to −0.32 mm compared to the −0.1 mm above, i.e. the adjustment needed to the spherical mirror becomes much more important if the grating is not perfectly flat.

Further, if a removable diffraction grating is held off-axis (for example if there are three removable diffractions gratings held in a triangular formation), then any rotation of the turret in which the removable diffraction gratings are held will significantly alter the path length and average angle (e.g. the angle at which the diffraction grating is presented to the spherical mirror) that the light has to travel along. Therefore, an automatic focus adjustment allows for a significant improvement in the image formed on a detector as the focus is adjusted and therefore, the image is clearer.

The invention claimed is:

1. A spectrometer, comprising:
   an inlet for the receipt of incident light;
   an optical path for transmitting the incident light from the inlet to an analysis plane;
   a focusing element located along the optical path, wherein the spectrometer has an in-focus position in which a focal point of the spectrometer and the analysis plane coincide; and
   a controller adapted in use, when a removable light disperser is placed along the optical path, to cause the spectrometer to be in the in-focus position by controlling the position of the focusing element relative to the analysis plane, wherein the removable light disperser is movable in the optical path, the controller being further adapted, in accordance with the position of the removable light disperser, to maintain the spectrometer in the in-focus position on movement of the removable light disperser by controlling the position of the focusing element relative to the analysis plane.

2. The spectrometer according to claim 1, wherein the focusing element is moveable along a rail by the controller.

3. The spectrometer according to claim 1, wherein the focusing element is moveable linearly, such that for small movements there will be negligible change in the wavelength range of the light directed onto the analysis plane.

4. The spectrometer according to claim 1, wherein the focusing element is a mirror.

5. The spectrometer according to claim 1, further comprising a collimator in the optical path between the inlet and the removable light disperser.

6. The spectrometer according to claim 5, wherein the collimator is a mirror.

7. The spectrometer according to claim 1, wherein the removable light disperser is mountable on a removable rotatable turret.

8. The spectrometer according to claim 7, wherein the removable rotatable turret has at least two diffraction gratings mounted thereon.

9. The spectrometer according to claim 1, wherein the removable light disperser is a diffraction grating.

10. The spectrometer according to claim 9, wherein the diffraction grating(s) is/are a reflective diffraction grating(s).

11. The spectrometer according to claim 1, wherein the controller is adapted in use to maintain the spectrometer in the in-focus position by controlling the position of the focusing element relative to the analysis plane based on the particular removable light disperser being used.

12. The spectrometer according to claim 11, wherein the removable light disperser has a unique identifier recognizable by the controller.

13. The spectrometer according to claim 12, wherein the unique identifier is stored on an RFID tag attached to the removable light disperser.

14. The spectrometer according to claim 1, wherein the controller is adapted in use to maintain the spectrometer in the in-focus position by controlling the position of the focusing element relative to the analysis plane based on a mathematical relationship.

15. The spectrometer according to claim 1, further comprising an optical element(s) able to reconfigure the optical path to transmit light from a second inlet and/or to a second analysis plane.

16. A spectrograph, comprising:
    a spectrometer according to claim 1, further including an analysis plane; and
    a detector positioned with a detection sensor at the analysis plane of the spectrometer.

17. The spectrograph according to claim 16, further comprising an optical element(s) in the spectrometer able to reconfigure an optical path passing through the spectrometer to transmit light from a second inlet of the spectrometer and/or to a second analysis plane of the spectrometer.

18. A method of identifying a focus point of a spectrometer, the method comprising:
    obtaining a spectrum using the spectrometer according to claim 1, with a removable light disperser placed along the optical path; and:
    i) analyzing a peak in the spectrum by monitoring the geometry of the peak;
    ii) calculating a focus value for the peak in dependence upon the said monitored geometry;
    iii) repeating steps (i) and (ii) using different positions of the focusing element relative to the analysis plane; and
    iv) analyzing said focus values so as to obtain an in-focus position.

19. The method according to claim 18, wherein step (iv) further comprises analyzing said focus values in accordance with the positions of the focusing element so as to generate relationship between said focus values and said positions.

20. A method of operating a spectrometer according to claim 19, comprising monitoring the position of the removable light disperser when placed along the optical path and causing the spectrometer to be in the in-focus position by controlling the position of the focusing element relative to the analysis plane in accordance with said relationship.

21. A method according to claim 20, wherein the spectrometer is maintained in the in-focus position automatically during use of the spectrometer by a user.

22. The method according to claim 18, wherein monitoring the geometry of the peak comprises monitoring the resolution of the peak and the asymmetry of the peak.

23. The method according to claim 22, wherein monitoring the resolution comprises monitoring one or each of the FWHM or peak intensity of the peak.

* * * * *